US 6,854,787 B2

(12) United States Patent
Gehman et al.

(10) Patent No.: US 6,854,787 B2
(45) Date of Patent: Feb. 15, 2005

(54) EXPANDABLE TRAVEL TRAILER

(75) Inventors: Dana K. Gehman, Somerset, PA (US);
David R. Turner, Rockwood, PA (US);
James R. Hall, Johnstown, PA (US);
Robert H. Thompson, Boswell, PA
(US)

(73) Assignee: Fleetwood Folding Trailers, Inc.,
Somerset, PA (US)

( * ) Notice: Subject to any disclaimer, the term of this patent is extended or adjusted under 35 U.S.C. 154(b) by 0 days.

(21) Appl. No.: 10/435,868

(22) Filed: May 12, 2003

(65) Prior Publication Data

US 2003/0193213 A1 Oct. 16, 2003

Related U.S. Application Data

(63) Continuation of application No. 10/033,256, filed on Dec. 27, 2001, now Pat. No. 6,561,570.
(60) Provisional application No. 60/258,972, filed on Dec. 29, 2000.

(51) Int. Cl.[7] .................................................. B60P 3/34
(52) U.S. Cl. ...................... 296/171; 296/175; 296/26.09
(58) Field of Search .......................... 296/26.01, 26.08, 296/26.09, 177, 156, 164, 165, 188, 170, 172, 173, 175, 176

(56) References Cited

U.S. PATENT DOCUMENTS

| 2,519,517 | A | * | 8/1950 | Van Tassel |
| 2,995,398 | A | * | 8/1961 | Davenport |
| 3,360,891 | A | * | 1/1968 | Gardner |
| 3,377,098 | A | * | 4/1968 | Bontrager |
| 3,475,047 | A | * | 10/1969 | Daniels ....................... 296/170 |
| 3,572,809 | A | * | 3/1971 | Buland |
| 3,608,953 | A | * | 9/1971 | Bernard |
| 3,680,908 | A | * | 8/1972 | Bowen |
| 3,740,088 | A | * | 6/1973 | Ratcliff |
| 4,133,571 | A | * | 1/1979 | Fillios |
| 5,050,927 | A | * | 9/1991 | Montanari ................... 296/170 |
| 5,143,417 | A | * | 9/1992 | Philley et al. ............... 296/176 |
| 5,154,469 | A | * | 10/1992 | Morrow ....................... 296/171 |
| 5,505,515 | A | * | 4/1996 | Turner ......................... 296/173 |
| 5,509,709 | A | * | 4/1996 | Carroll ........................... 296/3 |
| 5,658,032 | A | * | 8/1997 | Gardner ....................... 296/175 |
| 5,992,920 | A | * | 11/1999 | Bailey et al. ................ 296/169 |
| 6,007,142 | A | * | 12/1999 | Gehman et al. ............. 296/171 |
| 6,203,097 | B1 | * | 3/2001 | Podgorney ................... 296/170 |
| 6,217,106 | B1 | * | 4/2001 | Reckner, Jr. ................ 296/173 |
| 6,224,126 | B1 | * | 5/2001 | Martin et al. ............. 296/26.01 |
| 6,257,638 | B1 | * | 7/2001 | Graber ..................... 296/26.09 |
| 6,354,646 | B1 | * | 3/2002 | McManus et al. ........ 296/26.13 |
| 2002/0074815 | A1 | * | 6/2002 | McManus et al. ........ 296/26.01 |
| 2002/0074816 | A1 | * | 6/2002 | McManus et al. ........ 296/26.13 |
| 2002/0078634 | A1 | * | 6/2002 | McManus et al. ............. 52/67 |

* cited by examiner

Primary Examiner—D. Glenn Dayoan
Assistant Examiner—H. Gutman
(74) Attorney, Agent, or Firm—Webb Ziesenheim Logsdon Orkin & Hanson, P.C.

(57) ABSTRACT

The travel trailer includes a chassis having wheels and a trailer body attached to the chassis. The trailer body includes sidewalls, a front end wall, a rear end wall, a roof, and a floor. The sidewalls, end walls, roof, and floor form an internal living space of the trailer body. A slide-out area is slidably extendable outward from the trailer body. The slide-out area is extendable from a retracted position received substantially within the trailer body to an extended position extended outward from the trailer body. The slide-out area has a roof, sidewalls, a bottom wall, and a front end wall. The front end wall of the slide-out areas is adapted to seal against the trailer body in the retracted position.

31 Claims, 12 Drawing Sheets

EXPANDABLE TRAVEL TRAILER

CROSS-REFERENCE TO RELATED APPLICATION

This application is a continuation of U.S. patent application Ser. No. 10/033,256, filed Dec. 27, 2001, now U.S. Pat. No. 6,561,570, which claims the benefit of U.S. Provisional Application Ser. No. 60/258,972 filed Dec. 29, 2000, entitled "Expandable Travel Trailer".

BACKGROUND OF THE INVENTION

1. Field of the Invention

The present invention relates to an expandable travel trailer and, more particularly, a travel trailer having slide-out areas extendable from the body of the travel trailer.

2. Description of the Prior Art

In the recreational vehicle industry, folding camping trailers are generally characterized by a solid lower body structure, a vertically extendable solid roof structure, longitudinally and/or laterally extendable sleeping areas or dining areas, and tented sections extending between the lower body and roof. Folding camping trailers form an enclosed temporary living area commonly used for camping.

In the recreational vehicle industry, travel trailers are generally characterized by four solid full-height walls, a solid floor, and a solid roof that together define a temporary living area. Travel trailers are also commonly used for camping. Travel trailers are known to include expandable areas commonly referred to as "slide-outs" to expand the usable living area once the travel trailer is parked and ready for occupancy. When the travel trailer is in storage or in transit, the slide-outs are retracted into the body of the travel trailer. Slide-outs are known to extend longitudinally and/or laterally from the body of the travel trailer.

A recent evolution in the recreational vehicle industry combines the solid walled features of a travel trailer and the lighter weight expandability of folding camping trailers in a single unit. These units are commonly referred to as hybrid travel trailers. These units have the appearance of a generic travel trailer but when set up for occupancy they feature sleeping areas that fold down from the front and rear end walls of the trailer to create a tent enclosed sleeping area. This creates additional sleeping areas that fold into the body of the trailer when not in use. U.S. Pat. No. 5,992,920 to Bailey et al. discloses one embodiment of such a hybrid travel trailer.

A common structure for these fold-down sleeping areas includes a solid platform mattress deck that hinges downward from the front and/or rear end wall of the trailer. The front and rear end walls of the trailer feature a large opening that is revealed as the mattress deck is pivoted downward. A folded tent enclosure is typically located in this opening. The mattress deck hinges downward to a horizontal plane and is often supported by several "prop rods" that attach to the chassis or end wall of the trailer. The folded tent enclosure is typically concealed behind the mattress deck and is unfolded and erected over the mattress deck to create the sleeping area. The extended sleeping areas are accessed from the main living space of the trailer.

A known disadvantage with trailers having tent enclosed sleeping areas is that there is often water leakage in the area where the tent enclosure meets the solid end walls of the trailer body and, further, where the hinged mattress deck meets the solid end wall of the trailer body. In addition, the beds of these trailers cannot be occupied or used until the trailer is fully set up with all beds extended.

In view of the foregoing, an object of the present invention is to provide a travel trailer having extendable slide-out areas for increasing the usable living space of the travel trailer. It is a further object of the present invention to provide a travel trailer with extendable slide-out areas having improved water leakage characteristics through the use of improved latching and gasketing in the travel trailer. In addition, it is an object of the present invention to reduce or prevent the collection of dirt and debris on the roof of the extendable slide-out area. Furthermore, it is an object of the present invention to provide a travel trailer having a slide-out area with an improved sliding mechanism for ease of use.

SUMMARY OF THE INVENTION

The above objects are accomplished with a travel trailer made in accordance with the present invention. The travel trailer includes a chassis having wheels. The travel trailer further includes a trailer body attached to the chassis and having rigid sidewalls, a rigid front end wall, a rigid rear end wall, a rigid roof, and a floor. The sidewalls, end walls, roof, and floor define an internal space of the trailer body. At least one slide-out area is slidably extendable outward from the trailer body. The slide-out area is extendable from a retracted position received substantially within the trailer body to an extended position extended outward from the trailer body. The slide-out area may be extendable from one or both of the end walls of the trailer body or one or both of the sidewalls of the trailer body.

The slide-out area may have a rigid peaked roof. The slide-out area includes a rigid roof, rigid sidewalls connected to the roof, and a rigid bottom wall connected to the sidewalls. A rigid front end wall is connected to the roof, sidewalls, and bottom wall of the slide-out area. The front end wall may have a flange extending around the perimeter of the front end wall. A sealing gasket is preferably attached to the flange to face the trailer body for sealing against the trailer body in the retracted position of the slide-out area. The sealing gasket may include a wiper seal configured to engage the trailer body in the retracted portion of the trailer body. Thus, the slide-out area is adapted to seal against the trailer body in the retracted position.

The front and or rear end wall of the trailer body may define an opening for receiving the slide-out area into the trailer body in the retracted position. The travel trailer may further include a pair of substantially horizontal guide rails attached to internal sides of the sidewalls of the trailer body, respectively. The guide rails may be located on the internal sides of the end walls of the trailer body if the slide-out area is adapted to extend from one or both of the sidewalls of the trailer body. A pair of rollers may be attached, respectively, to lateral sides of the bottom wall of the slide-out area and may be received in the guide rails for providing slidable movement of the slide-out area relative to the trailer body.

The travel trailer may further include a removable external support for supporting the slide-out area in the extended position. The support may include a support member configured for removable connection to the trailer body and, preferably, a bracket attached to the end walls or sidewalls of the trailer body. The support may further include a leg member connected to the support member. The leg member may be configured for removable connection to the chassis for supporting the slide-out area in the extended position. The leg member may be pivotally connected to the support member.

An external roller may be attached to the front end wall of the slide-out area. The external roller is preferably positioned to coact with the support member such that when the slide-out area is moved between the extended and retracted positions the external roller is guided along the top surface of the support member.

At least one and, preferably, a pair of clamping devices may be attached to, for example, the bottom wall of the slide-out area. The clamping devices may include a first member fixedly attached to the slide-out area and a second member pivotally connected to the first member. The second member may have a threaded tube and the clamping devices may have a threaded member coacting with the threaded tube. The threaded member may coact with the threaded tube such that rotation in a first direction extends the threaded member to contact the trailer body and applies tension force between the slide-out area and the trailer body for reducing vibration therebetween. The clamping devices may be further used to compress sealing gaskets attached to the slide-out area, the trailer body, or both.

The travel trailer may further include internal structures located within the trailer body that are configured to fold down to a position below the bottom wall of the slide-out area such that the slide-out area may be moved to the retracted position received substantially within the trailer body. One or more support legs may be pivotally attached to the bottom wall of the slide-out area and configured to connect removably to the chassis for supporting the slide-out area in the extended position.

The present invention is further directed to a sealing arrangement for the travel trailer. The travel trailer as indicated previously includes a trailer body with a slide-out area. The trailer body defines an opening for receiving the slide-out area into the trailer body. The slide-out area is movable between a retracted position received substantially within the trailer body and an extended position extending outward from the trailer body. The sealing arrangement includes a first flange plate connected to the trailer body and extending into the opening in the trailer body accommodating the slide-out area. The first flange plate has a pair of sealing gaskets attached to the opposite side thereof. The sealing arrangement further includes a second flange plate attached to the end of the slide-out area received within the trailer body. The second flange plate engages one of the sealing gaskets attached to the first flange plate to provide a substantially weather tight seal between the slide-out area and trailer body when the slide-out area is in the extended position. When the slide-out area is in the retracted position, a front end wall of the slide-out area engages the other of the pair of sealing gaskets to provide a substantially weather tight seal between the slide-out area and trailer body.

The sealing gaskets may have wiper seals for wiping rigid surfaces of the slide-out area as the slide-out area is moved between the extended and retracted positions. The sealing arrangement may further include an additional sealing gasket attached to the slide-out area for engaging the trailer body in the retracted position of the slide-out area.

The present invention is also a method of using an expandable travel trailer having at least one slide-out area as generally described hereinabove. The method may comprise the steps of: connecting the support member to the front end wall of the trailer body; pivoting the leg member downward and connecting the leg member to the extended portion of the chassis; and moving the slide-out area from a retracted position located within the trailer body to the extended position extended outward from the trailer body, wherein as the slide-out area is moved to the extended position the external roller is guided along the top surface of the support member.

Further details and advantages of the present invention will become apparent from the following detailed description when read in conjunction with the drawings.

DETAILED DESCRIPTION OF THE INVENTION

Figure 1:
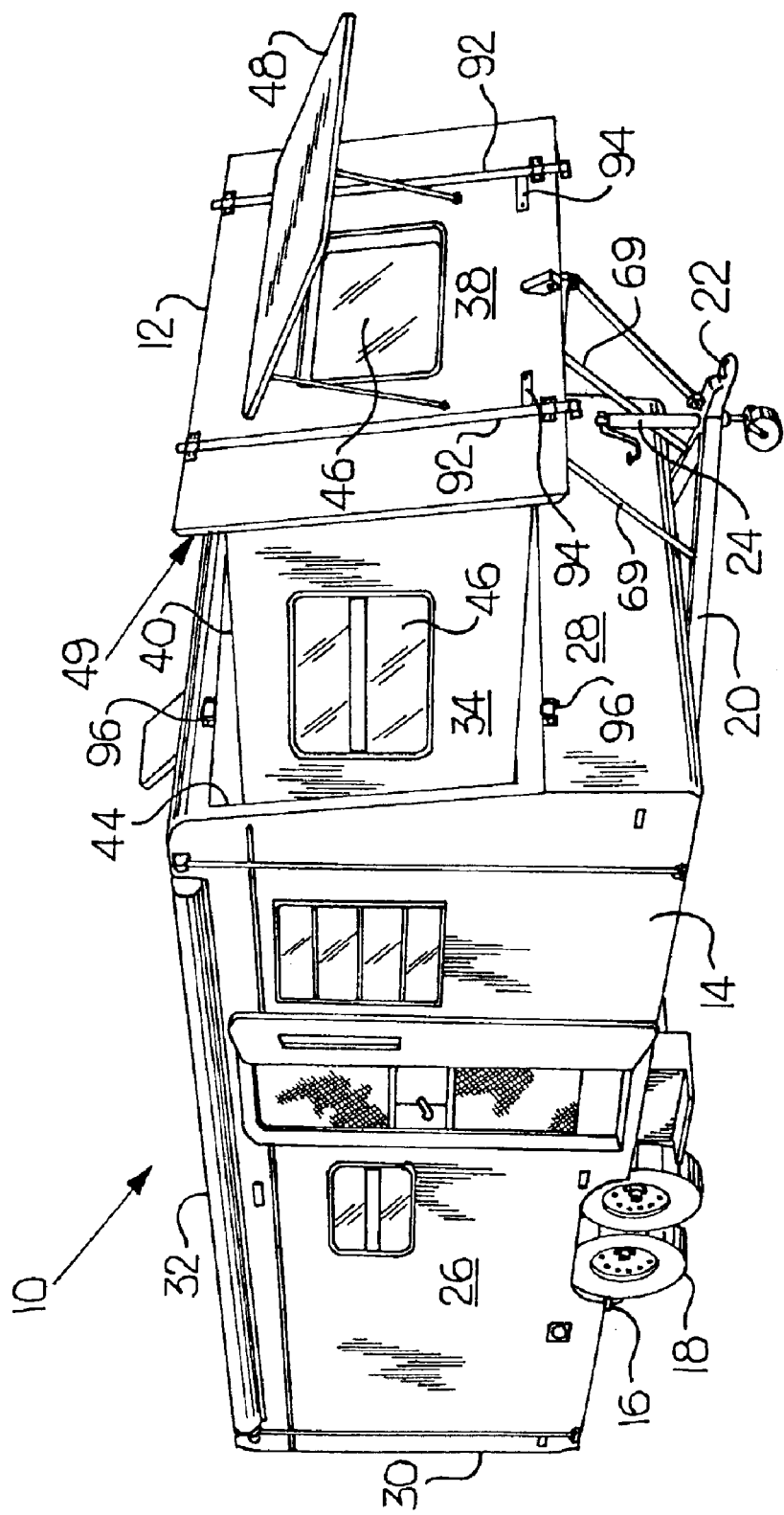
FIG. 1 is a perspective view of an expandable travel trailer having a slide-out area in accordance with the present invention.
Figure 2:
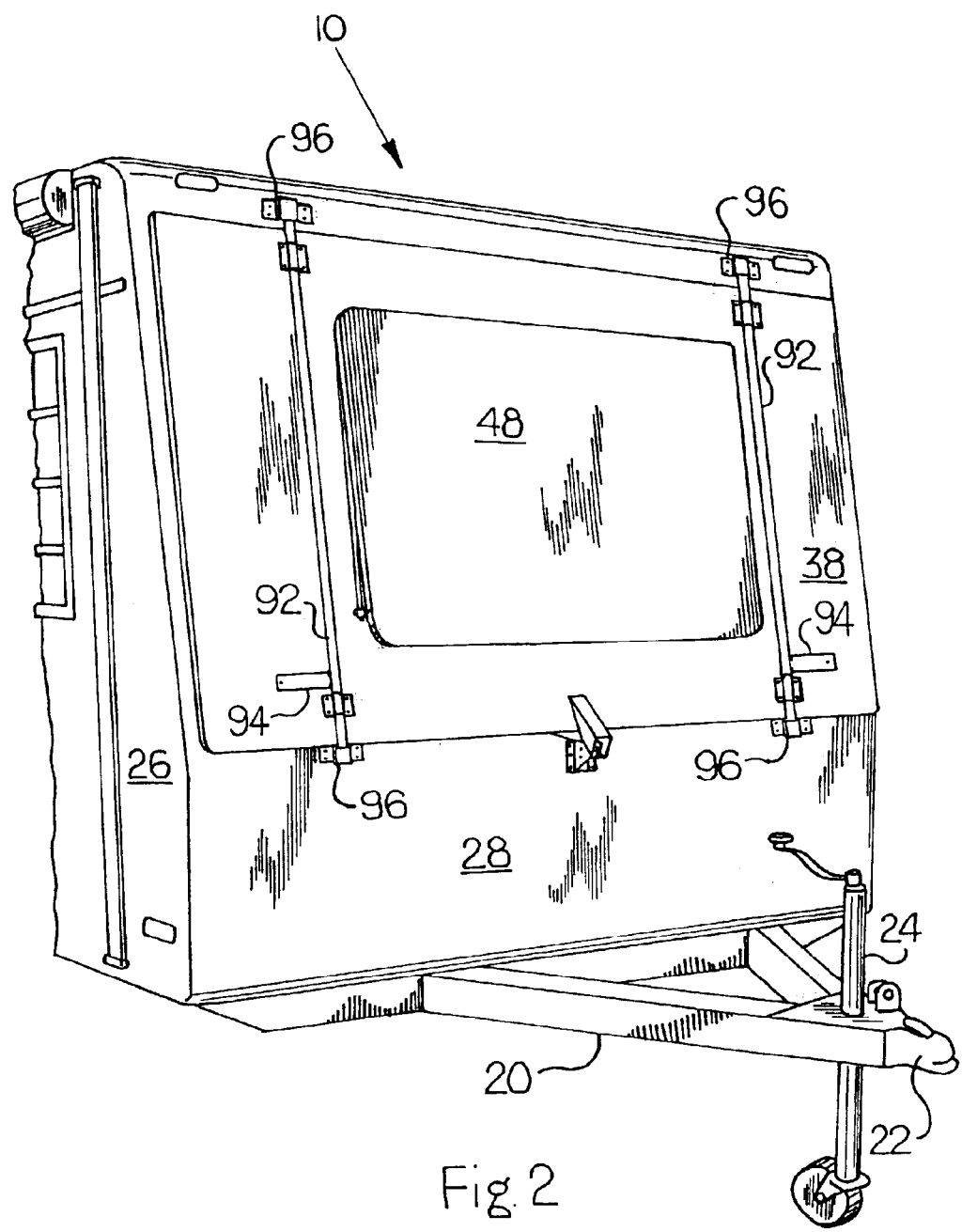
FIG. 2 is a perspective front end view of the travel trailer of FIG. 1.

FIGS. 1 and 2 generally show an expandable travel trailer 10 having an extendable slide-out area 12 in accordance with the present invention. In FIGS. 1 and 2, only one slide-out area 12 is shown but the present invention envisions that a second slide-out area may be extendable longitudinally from the rear end wall of the travel trailer 10, or laterally extendable from a sidewall of the travel trailer 10. The travel trailer 10 generally includes a rectangular-shaped trailer body 14 that is attached to a conventional chassis 16 (only partially shown in FIGS. 1 and 2). The chassis 16 includes wheels 18 and an extended portion 20 with a trailer hitch 22 for towing the travel trailer 10. An extendable support wheel 24 is connected to the extended portion 20 for supporting the travel trailer 10 when it is parked.

The trailer body 14 is defined by two longitudinally extending sidewalls 26, a front end wall 28, and a rear end wall 30. The sidewalls 26 and end walls 28, 30 are connected to a floor 31 of the travel trailer 10 in a conventional manner. The sidewalls 26, the front end wall 28, and the rear end wall 30 are all solid structures. The travel trailer body 14 is enclosed by a hard shell roof 32 which is connected to the sidewalls 26, the front end wall 28, and the rear end wall 30. The sidewalls 26, end walls 28, 30, floor 31, and roof 32 are preferably provided as solid structures (i.e., panels) having a foam core, plywood sheets located on both sides of the foam core, and a fiberglass exterior. The roof 32 may include wood trusses that form a "peak". A rubber membrane (not shown) may be used to seal the roof 32 as is known in the art.

As stated previously, the travel trailer 10 of the present invention includes at least one slide-out area 12 or slide-out room (hereinafter referred to as "slide-out 12"). The slide-out 12 may extend longitudinally outward from the front end wall 28 and/or rear end wall 30 of the trailer body 14. Further, the slide-out 12 may be configured to extend laterally from one or both of the sidewalls 26 of the trailer body 14. The slide-out 12 described hereinafter extends from the front end wall 28 of the trailer body 14.

Referring now to FIGS. 1–4, the slide-out 12 is generally rectangular-shaped and defined by two rigid sidewalls 34, a rigid bottom wall 36, a rigid front end wall 38, and a rigid roof 40. As discussed further hereinafter, the roof 40 is preferably "peaked". The peaked roof 40 naturally sheds rain water and debris and is inherently stronger than a flat roof structure. The sidewalls 34, bottom wall 36, front end wall 38, and peaked roof 40 are preferably provided as solid structures (i.e., panels) having a foam core, plywood sheets located on both sides of the foam core, and a fiberglass exterior.

The slide-out 12 fits within an opening 44 defined in the front end wall 28 of the trailer body 14. The slide-out 12 is preferably slidably connected to the sidewalls 26 of the trailer body 14 as discussed further hereinafter. The slide-out 12 may include windows 46 in the sidewalls 34 and front end wall 38 of the slide-out 12. A window cover 48 may be pivotally attached to the front end wall 38 of the slide-out 12 to protect the window 46 in the front end wall 38. As shown in FIG. 1, the front end wall 38 of the slide-out 12 includes an extended flange 49 extending around the perimeter of the front end wall 38, and configured to cooperate with the front end wall 28 of the trailer body 14.

Figure 3:
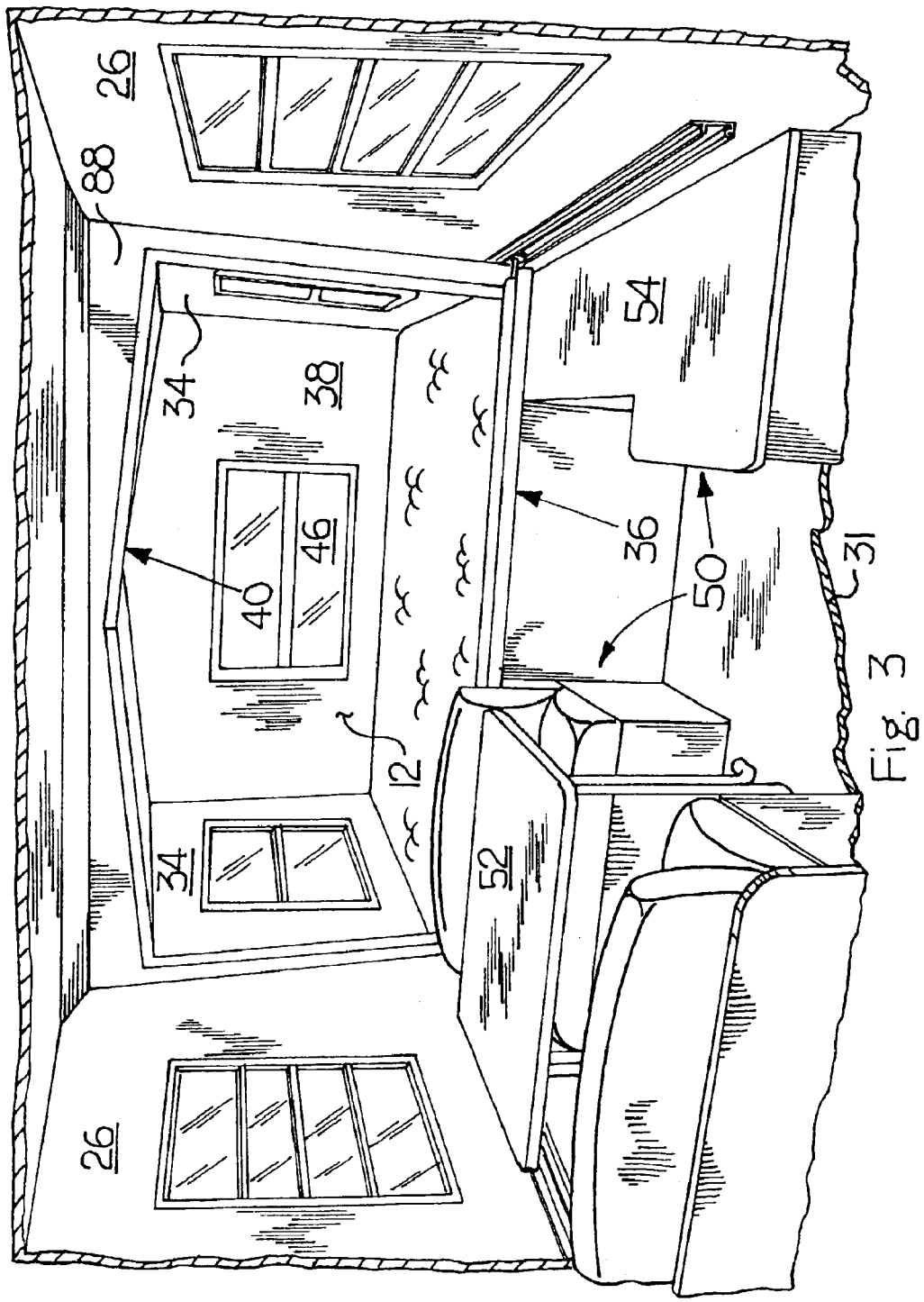
FIG. 3 is an internal perspective view of the slide-out area in the travel trailer of FIG. 1.
Figure 4:
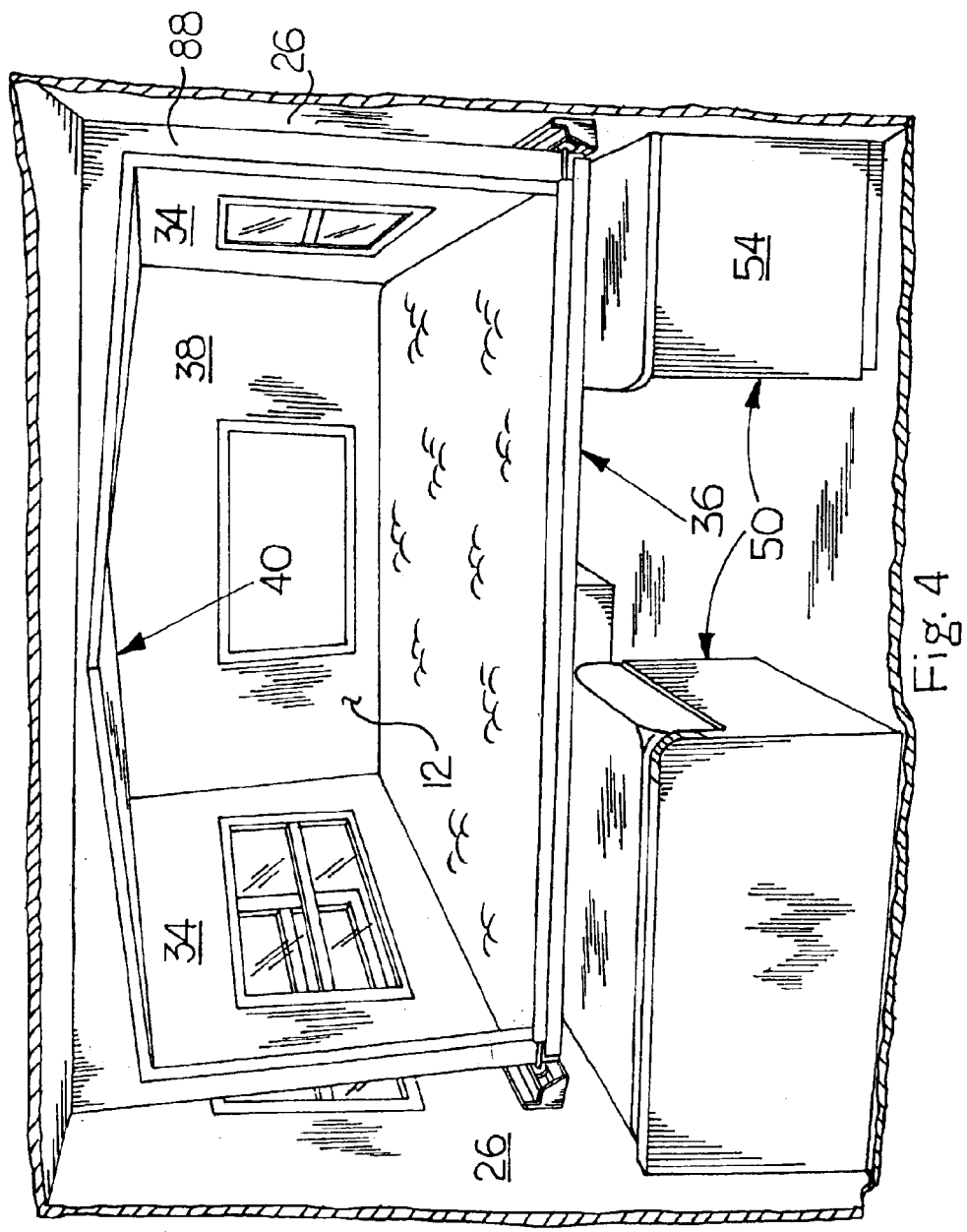
FIG. 4 is an internal perspective view of the slide-out area in the travel trailer of FIG. 1 showing the slide-out area in a partially retracted position.
Figure 5:
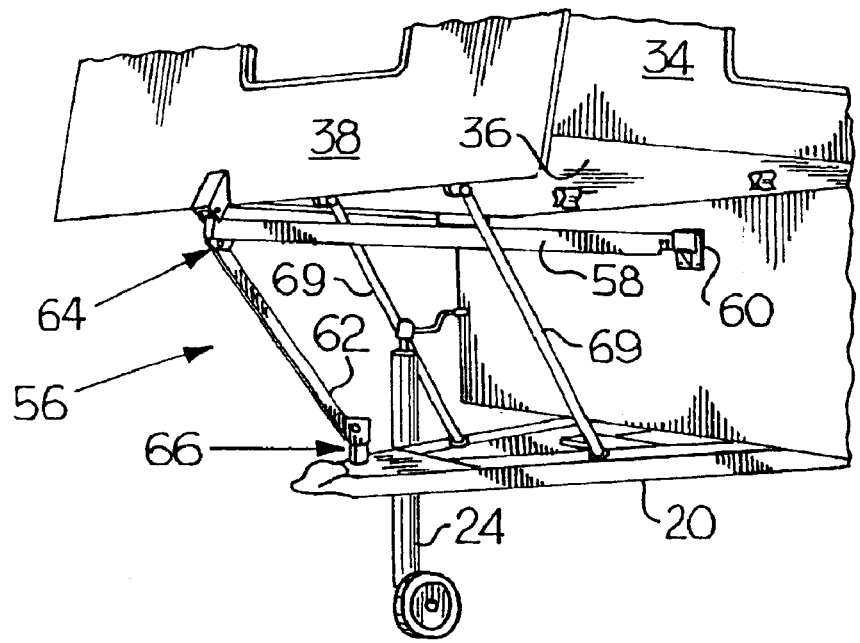
FIG. 5 is a perspective view of the front end of the travel trailer of FIG. 1 showing details of a trailer hitch area of the travel trailer.
Figure 6:
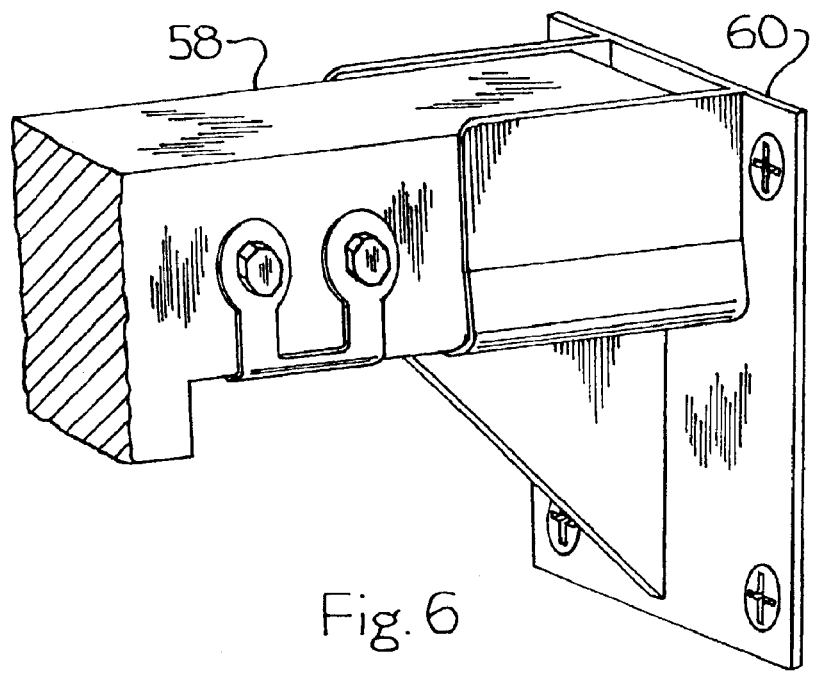
FIG. 6 is a perspective view of a bracket attached to a front end wall of the travel trailer of FIG. 1.
Figure 7:
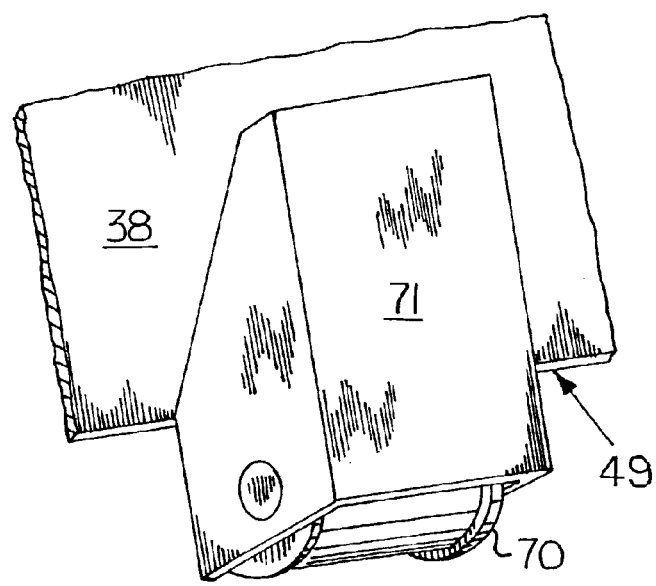
FIG. 7 is a perspective view of a roller attached to a front end wall of the slide-out area of FIG. 1.
Figures 11, 12:
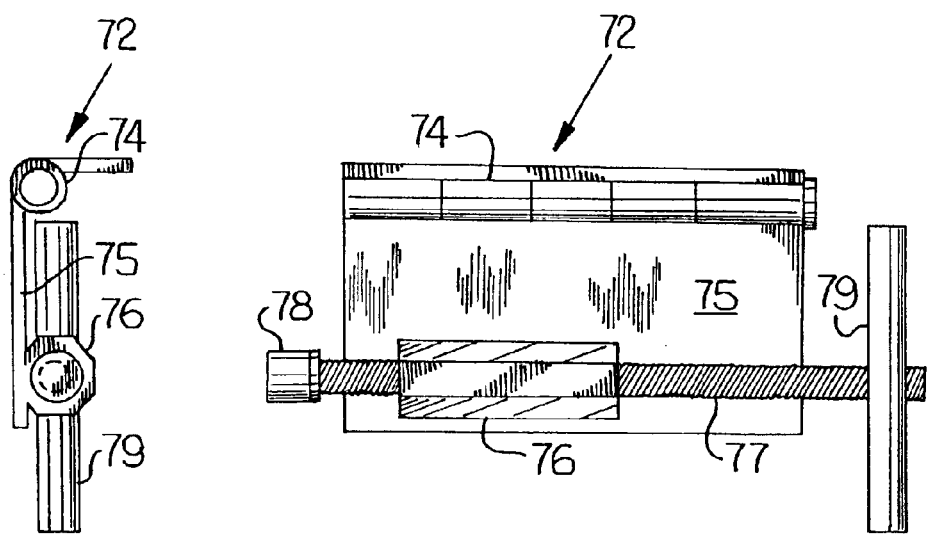
FIG. 11 is a side view of the clamping device of FIGS. 9 and 10 detached from the travel trailer.
FIG. 12 is an end view of the clamping device of FIGS. 9 and 10 detached from the travel trailer.

FIGS. 1 and 3, respectively, show external and internal perspective views of the slide-out 12 with the slide-out 12 in a fully extended configuration or position. FIG. 3 further shows the expanded internal living area defined by the slide-out 12. In the extended position, the slide-out 12 is cantilevered outward from the front end wall 28 of the trailer body 14 and further supported by an external support as described hereinafter. FIG. 4 shows a second internal perspective view of the slide-out 12 in a partially retracted or closed position. Internal structures 50 of the travel trailer 10, such as a dining table 52 and a cabinet 54, are shown in FIGS. 3 and 4. The internal structures 50 are configured to fold down to a position below the bottom wall 36 of the slide-out 12 so that the slide-out 12 may be retracted into the trailer body 14. In a fully retracted position, the slide-out 12 lies above the internal structures 50 located within the trailer body 14 as shown in FIG. 4. The sidewalls 34 and peaked roof 40 of the slide-out 12 are also received within the trailer body 14 as shown in FIG. 4.

Figure 8:
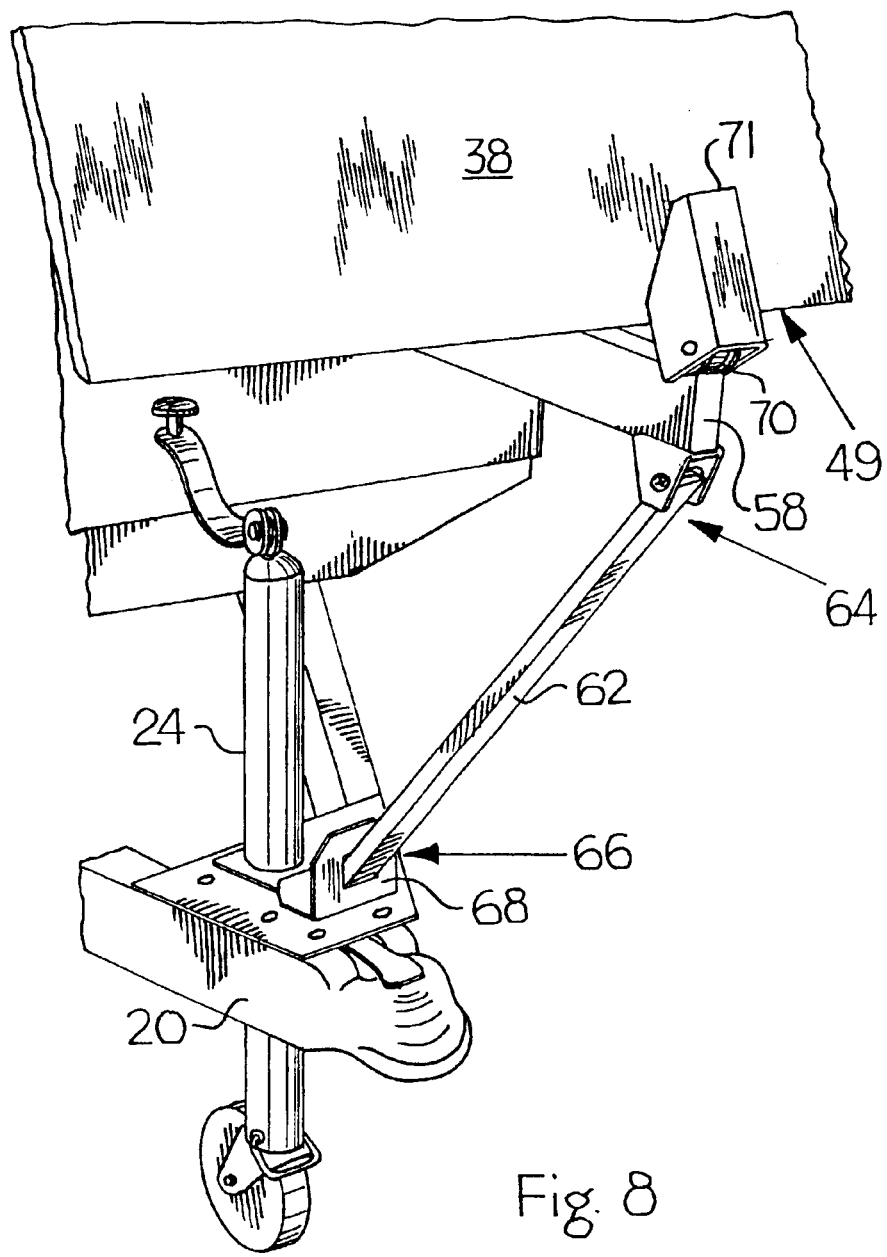
FIG. 8 is a perspective view of the front end wall of the travel trailer showing the roller coacting with a removable support attached to the trailer body.

Referring to FIGS. 5–8, in the extended position the slide-out 12 is supported by one or more external supports 56 that are detachably connected between the front end wall 28 of the trailer body 14 and the extended portion 20 of the chassis 16. The external support 56 includes a horizontal support member 58 that is removably attached to a bracket 60 permanently affixed to the front end wall 28 of the trailer body 14. A leg member 62 is pivotally connected to the support member 58 at a first end 64 of the leg member 62. A second end 66 of the leg member 62 is removably connected to the extended portion 20 of the chassis 16. In particular, the leg member 62 may be removably connected to a bracket 68 connected to the extended portion 20 of the chassis 16, as shown in FIG. 8. Once extended to the extended position, the slide-out 12 may be supported by additional support legs 69 (i.e., pivot legs) that swing downward from the bottom wall 36 of the slide-out 12 and connect to the front end wall 28 of the trailer body 14 or to the extended portion 20 of the chassis 16. The support legs 69 may be permanently affixed to the bottom wall 36 of the slide-out 12.

An external roller 70 is attached to the bottom of the extended flange 49 of the front end wall 38 of the slide-out area 12. The external roller 70 is preferably located to coact with the top surface of the support member 58 of the external support 56, which forms a guide rail for the external roller 70 to slide over when the slide-out 12 is being moved between its retracted and extended positions. A stop block (not shown) may be provided at the end of the support member 58 to prevent over-extension of the slide-out 12. The support member 58 and the leg member 62 are detachable so that they may be stored during transportation of the travel trailer 10. The external support 56 may be stored within the trailer body 14. Multiple external supports 56 may be provided in the travel trailer 10 of the present invention. The external roller 70 may be carried in a protective housing 71, which is connected to or formed as part of the front end wall 38 of the slide-out 12. The protective housing 71 is located at the bottom of the extended flange 49 of the front end wall 38 of the slide-out 12.

Figure 9:
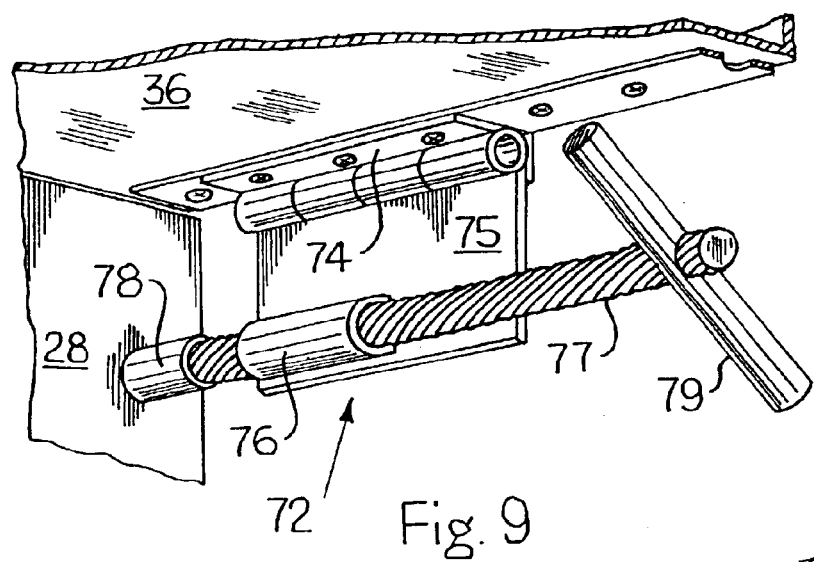
FIG. 9 is a perspective view of a portion of the underside of the slide-out area showing a clamping device attached to the bottom wall.
Figure 10:
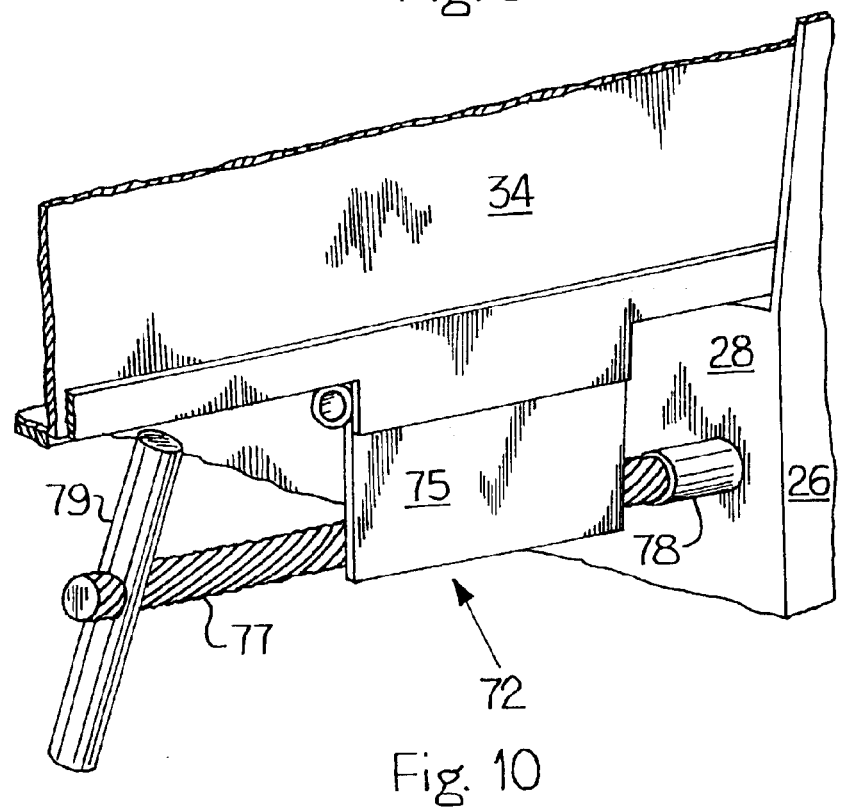
FIG. 10 is a second perspective view of the clamping device of FIG. 9.

Referring to FIGS. 9–12, a pair of clamping devices 72 is preferably attached to the underside of the bottom wall 36 of the slide-out 12 on each lateral side of the bottom wall 36. Only the right side clamping device 72 is shown in FIGS. 9 and 10 and will be discussed hereinafter. The clamping device 72 is hinged so that it may be folded into a generally flat configuration to allow the slide-out 12 to be retracted in the trailer body 14. The clamping device 72 is generally defined by a first member 74 that is fixedly attached to the bottom wall 36 of the slide-out 12, and a second member 75 hinged (i.e., rotatably connected) to the first member 74. The second member 75 carries a threaded tube 76 having a threaded member such as a screw 77 positioned therein. The screw 77 has a first end 78 configured to cooperate with the front end wall 28 of the trailer body 14. The second end of the screw 77 includes a handle 79 for rotation of the screw 77 within the threaded tube 76. The threaded connection between the screw 77 and the threaded tube 76 may be clockwise or counterclockwise. For example, clockwise rotation of the screw 77 could cause the screw 77 to progress through the threaded tube 76, and counterclockwise rotation of the screw 77 could cause the screw 77 to retract into the threaded tube 76, and vice versa. Additionally, the clamping devices 72 may be oppositely configured from one another in the travel trailer 10, with the right side clamping device 72 having a clockwise orientation and the left side clamping device 72 having a counterclockwise orientation, and vice versa.

When the slide-out 12 is in the fully extended position, the second members 75 of the clamping devices 72 are rotated downward and the screw 77 is rotated clockwise. The rotation of the screw 77 causes the screw 77 to progress within the threaded tube 76 until the first end 78 of each of the screws 77 engages the front end wall 28 of the trailer body 14. Further rotation of the screws 77 exerts a longitudinally directed "outward" force on the slide-out 12 relative to the trailer body 14 locking the slide-out 12 in the extended position. The force is generally directed parallel to the longitudinal axis of the travel trailer 10. Further outward movement of the slide-out 12 may be restrained by the stop block (not shown) at the end of the horizontal member 58 of the external support 56, or by abutment between a rearward edge of the slide-out 12 and the internal side of the front end wall 28 of the trailer body 14, as discussed further hereinafter. The clamping devices 72 firmly lock the slide-out 12 in its extended position thereby reducing or eliminating vibration of the slide-out 12 relative to the trailer body 14. This provides a more solid feel to the slide-out 12 and trailer body 14 as a whole. The clamping devices 72 may also be used to compress sealing gasket(s) located on the rearward edge of the slide-out 12 and/or on the internal side of the front end wall 28 of the trailer body 14 to provide a weather tight seal between the slide-out 12 and the trailer body 14, with the slide-out 12 in the extended position as discussed further hereinafter.

Figure 13:
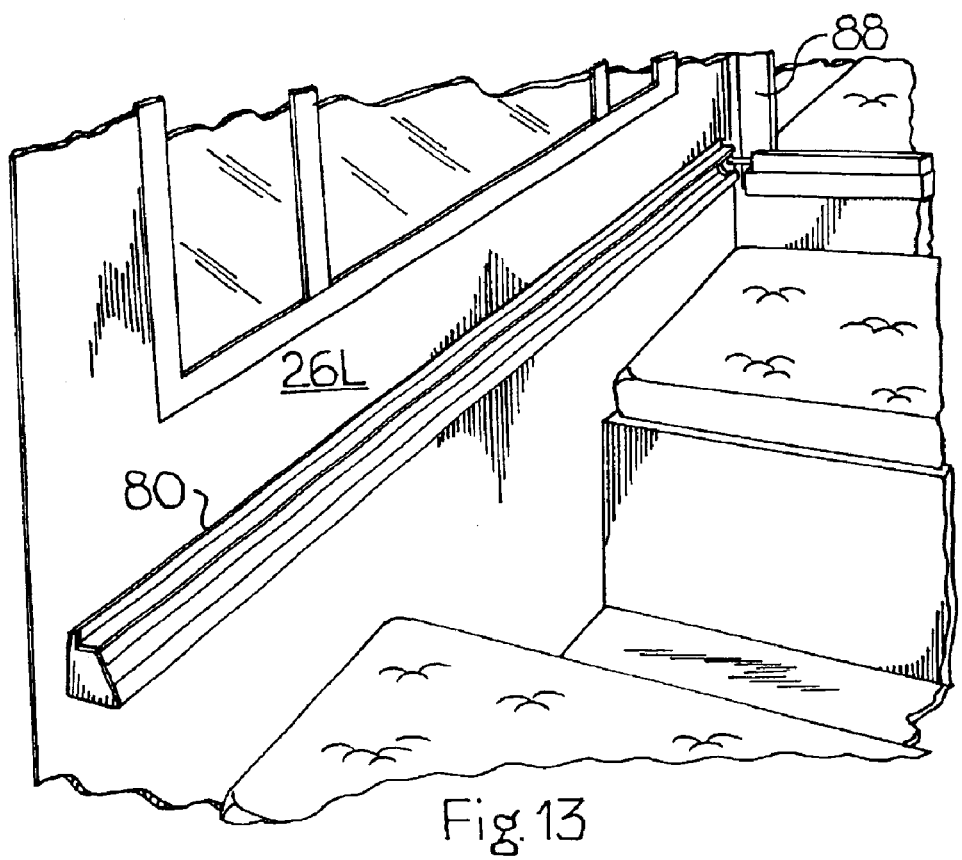
FIG. 13 is an internal left side perspective view of the travel trailer of FIG. 1 showing a guide rail attached to the internal side of the left sidewall of the travel trailer.
Figure 14:
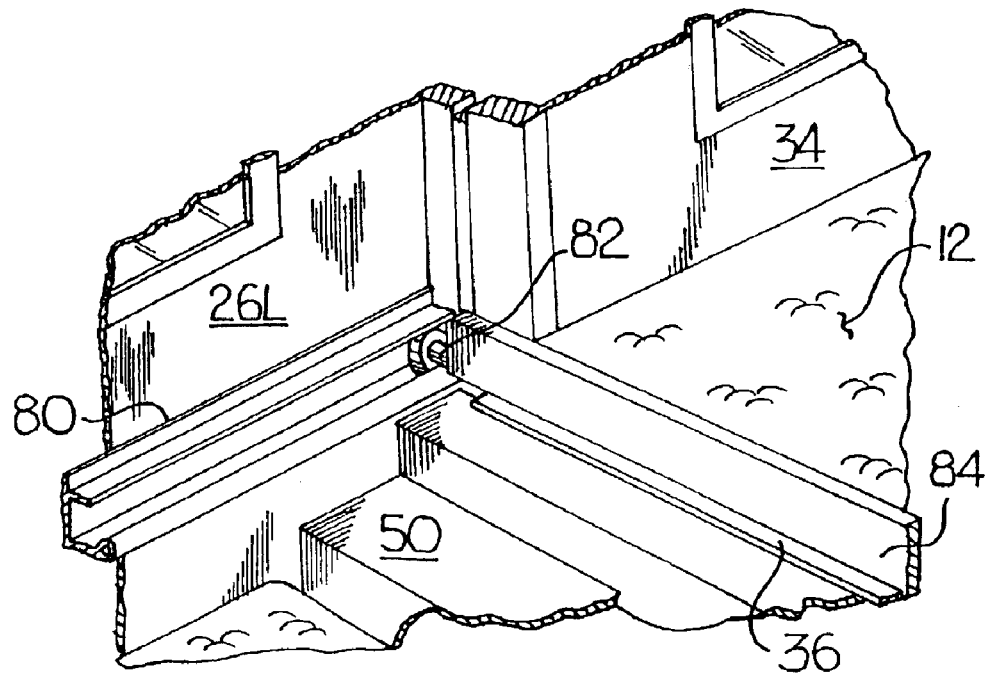
FIG. 14 is an internal left side perspective view of the travel trailer of FIG. 1 showing one embodiment of an internal roller of the slide-out area engaged in the guide rail of FIG. 13.
Figure 15:
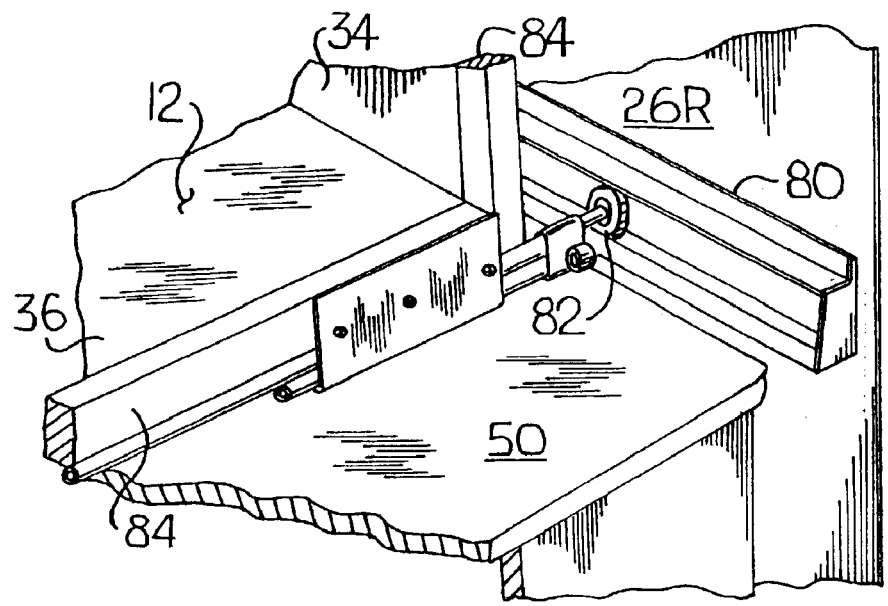
FIG. 15 is an internal right side perspective view of the travel trailer of FIG. 1 showing an alternative embodiment of an internal roller of the slide-out area engaged in a guide rail attached to the internal side of the right sidewall of the travel trailer.

Referring to FIGS. 13–15, the slidable connection between the slide-out 12 and the trailer body 14 will now be discussed. A pair of guide rails 80 is preferably attached, respectively, to the internal side of the sidewalls 26 of the trailer body 14. The internal sides of the sidewalls 26 in FIGS. 13–15 are designated with reference numerals 26L and 26R for left and right internal sidewalls, respectively, of the trailer body 14. "Left" and "right" designations are provided herein because the slide-out 12 extends from the front end wall 28 of the trailer body 14, and the internal views in FIGS. 13–15 are directed toward the front end wall 28 of the trailer body 14. The guide rails 80 are C-shaped in cross section and may be attached to the sidewalls 26L, 26R by any means customary in the art.

The slide-out 12 further includes internal rollers 82 that are attached to the bottom wall 36 of the slide-out 12. In particular, the internal rollers 82 are rotatably connected to lateral sides of the bottom wall 36 of the slide-out 12 and received, respectively, in the guide rails 80. The external roller 70 and internal rollers 82 are preferably nylon rollers. The rectangular structure of the slide-out 12 may, for example, be reinforced by frame members 84 extending around the perimeter of the bottom wall 36, and extending between the bottom wall 36 and peaked roof 40. Similar frame members may reinforce the peaked roof 40. The frame members 84 described hereinabove are well known and standard in the art. FIGS. 14 and 15 show one of the frame members 84 extending laterally along a rear edge of the bottom wall 36. The internal rollers 82 are preferably rotatably connected to this frame member.

The internal rollers 82 received within the guide rails 80 and the external roller 70 attached to the extended flange 49 at the front end wall 38 of the slide-out 12 provide three points of support for the slide-out 12. The external roller 70 supports substantially all the slide-out's 12 forward weight while the internal rollers 82 support substantially all the slide-out's 12 rearward weight in both the extended and retracted positions of the slide-out 12. The guide rails 80 may extend substantially all the way to the front end wall 28 of the trailer body 14 and may be closed at the end to provide a stop for the internal rollers 82 when the slide-out 12 is moved to the extended position. FIG. 14 shows one arrangement for connecting the internal rollers 82 to the frame member 84 and FIG. 15 shows an alternative arrangement for connecting the internal rollers 82 to the frame member 84. The arrangement shown in FIG. 14 is presently the preferred version, and the right side connection between the bottom wall 36 of the slide-out area 12 and the right internal sidewall 26R of the trailer body 14 will be configured in a similar manner to the left side shown in FIG. 14.

Figure 18:
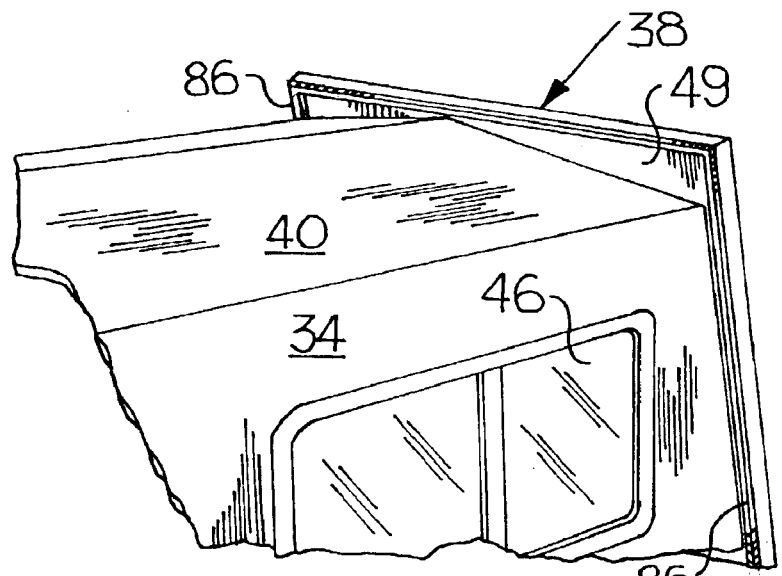
FIG. 18 is a rear-directed perspective view of the slide-out area of FIG. 16.
Figure 16:
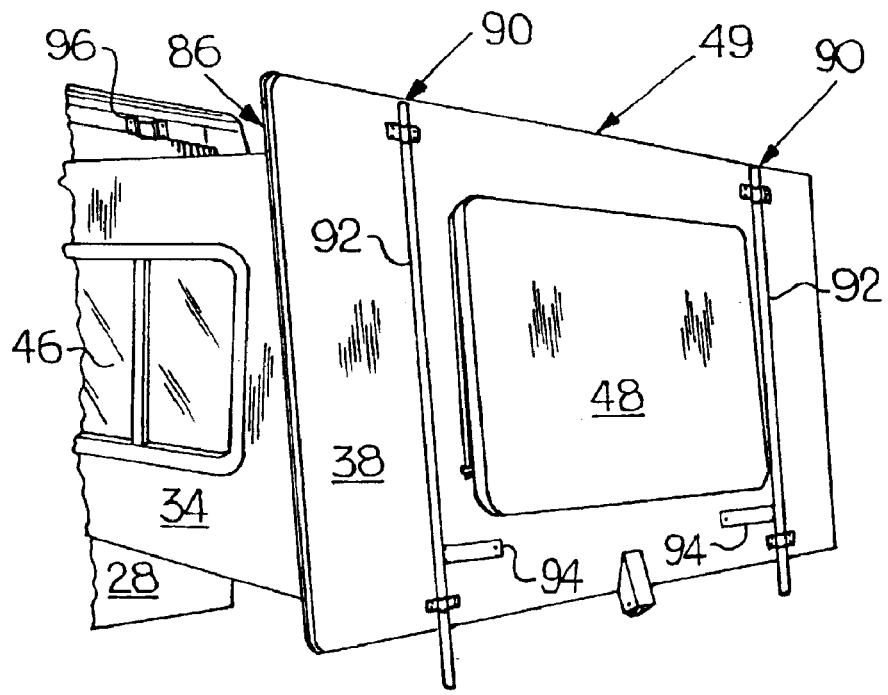
FIG. 16 is a front perspective view of the slide-out area of the travel trailer of FIG. 1 shown in an extended position.
Figure 17:
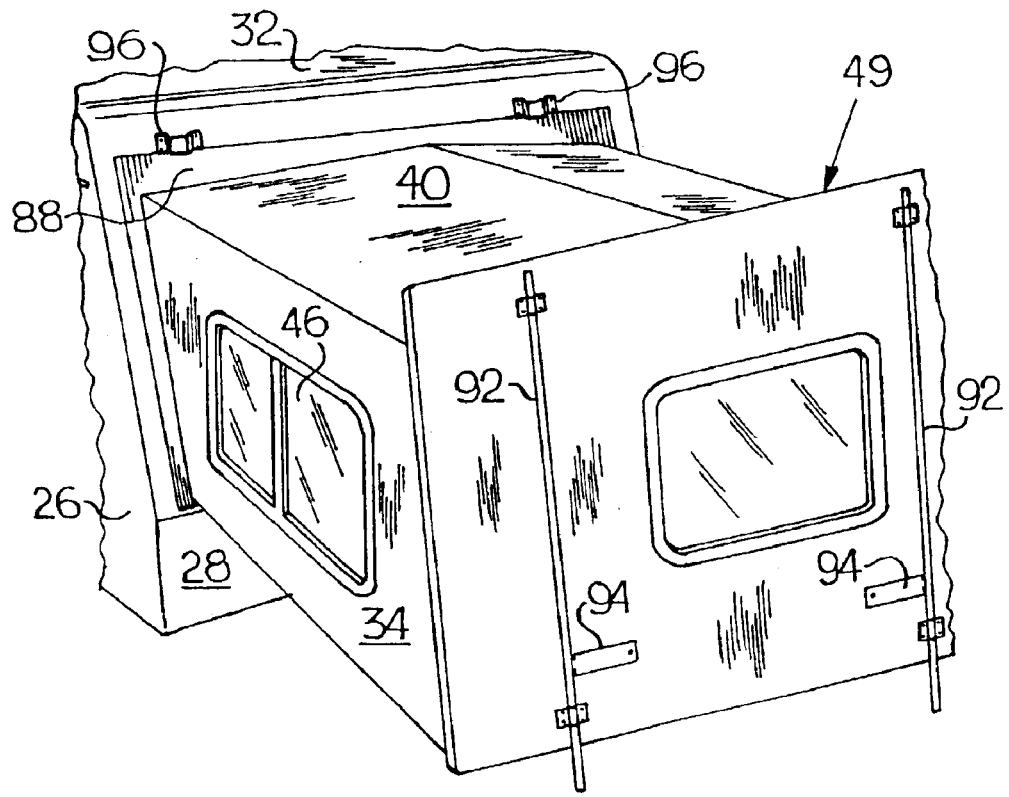
FIG. 17 is a top perspective view of the slide-out area of FIG. 16.

Referring to FIGS. 16–18, the slide-out 12 preferably includes a sealing gasket (or multiple sealing gaskets) 86 extending around the perimeter of the extended flange 49 of the front end wall 38 of the slide-out 12. The sealing gasket 86 is intended to coact with the rigid front end wall 28 of the trailer body 14 to provide a weather tight seal between the slide-out 12 and the trailer body 14 in the closed or retracted position of the slide-out 12.

Referring again to FIG. 3, the rear area of the slide-out 12, which defines a sleeping area in the travel trailer 10, preferably further includes a flange or lip portion 88 attached to the sidewalls 34, bottom wall 36, and roof 40 of the slide-out 12. This lip portion 88, in the extended position of the slide-out 12, cooperates with an internal surface or side of the front end wall 28 of the trailer body 14 thereby providing a fully enclosed and substantially weather tight living space within the travel trailer 10. A second sealing gasket (not shown) may be attached to the lip portion 88 to face the internal side of the front end wall 28 of the trailer body 14. The sealing gasket, when present, preferably extends around the perimeter of the lip portion 88 to provide a weather tight seal between the slide-out 12 and trailer body 14 in the extended or "set-up" position of the slide-out 12. The clamping devices 72, discussed previously, are used to compress the sealing gasket attached to the lip portion 88 to compress the sealing gasket against the internal side of the front end wall 28 of the trailer body 14 thereby providing a weather tight seal. A further discussion of a preferred sealing connection between the slide-out 12 and trailer body 14 is provided hereinafter in connection with FIGS. 19–21.

Referring to FIGS. 3 and 16–18, in order to provide proper sealing characteristics, the sealing gasket 86 is preferably compressed over substantially its entire length so that water leakage into the trailer body 14 of the travel trailer 10 is substantially prevented. To provide adequate compression of the sealing gasket 86, pressure must be distributed over strategic areas of the sealing gasket 86 and, preferably, over the entire length of the sealing gasket 86. The present invention further provides a pair of latching devices 90 attached to lateral sides of the front end wall 38 of the slide-out 12. The latching devices 90 each include a vertical steel rod 92 and a lever arm 94. The steel rod 92 transmits the rotation action of the lever arm 94 to four cam action engagements 96 attached to the front end wall 28 of the trailer body 14, which in turn exerts a fixed amount of pressure to the sealing gasket 86. The respective latching devices 90 each include one vertical rod 92, one lever arm 94, and two cam action engagements 96. Thus, the use of two latching mechanisms 90 results in four strategic points of compression along the length of the sealing gasket 86. The compressive force provided by the four cam action engagements 96 compresses the sealing gasket 86 at two points along the top edge of the extended flange 49, and at two points along the bottom edge of the extended flange 49. The lever arms 94 are preferably positioned such that an operator standing on the ground can easily operate the lever arms 94.

With reference to all the figures, operation of the slide-out 12 will now be discussed. With the slide-out 12 in the retracted position as shown, for example, in FIG. 2, the operator of the travel trailer 10 preferably first connects the support member 58 to the bracket 60 attached to the front end wall 28 of the trailer body 14. The leg member 62 is then rotated downward from the support member 58 and connected to the extended portion 20 of the chassis 16. The latching devices 90 located on lateral sides of the front end wall 38 of the slide-out 12 are unlatched releasing the compressive pressure on the sealing gasket 86. Upon unlatching the latching devices 90, the slide-out 12 may be extended from the retracted position to the extended or set-up position as shown, for example, in FIG. 1. The slide-out 12 smoothly moves from the retracted position to the extended position through the rotation of the two internal rollers 82 and the external roller 70. The external roller 70 is guided along the top surface of the support member 58. The two internal rollers 82 are guided by the guide rails 80 attached to the internal surfaces of the sidewalls 26 of the trailer body 14. Once extended to the extended position, the slide-out 12 may be supported by the additional support legs 69 (i.e., pivot legs) that swing downward from the bottom wall 36 of the slide-out 12 and connect to the front end wall 28 of the trailer body 14 or to the extended portion 20 of the chassis 16. The support legs 69 may be permanently affixed to the bottom wall 36 of the slide-out 12.

The second member 75 of each of the clamping devices 72 attached to the bottom wall 36 of the slide-out 12 is rotated to a vertical "set-up" position and the screw 77 is rotated until the first end 78 of the screw 77 contacts the front end wall 28 of the trailer body 14. Further rotation of the screw 77 causes "outward" longitudinal forces to act on the slide-out 12 locking the slide-out 12 in the extended position. The clamping devices 72 lock the slide-out 12 in place to eliminate vibration of the slide-out 12 relative to the trailer body 14. The clamping devices 72 also provide the outward pressure necessary to compress the sealing gasket, which may be extended around the perimeter of the internal lip portion 88 of the slide-out 12 or, alternatively, on the internal side of the front end wall 28 of the trailer body 14. Preferably, this sealing gasket extends around the opening 44 in the front end wall 28, and is sufficiently compressed by the clamping devices 72 to provide a water tight seal between the slide-out 12 and trailer body 14 in the extended position of the slide-out 12. The travel trailer 10 with a now enhanced living area is ready for use. The above-described process is generally followed in reverse to place the slide-out 12 in the retracted or closed position.

Figure 19:
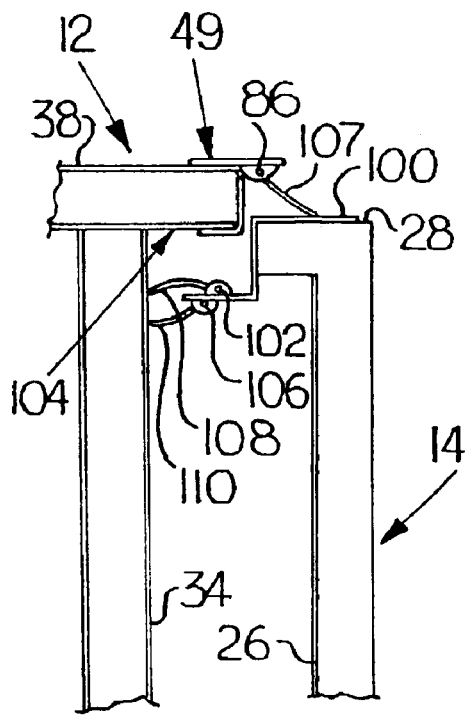
FIG. 19 is a schematic plan view of a right front corner of the slide-out area with the slide-out area in a substantially fully retracted position, and showing sealing gaskets connected to the slide-out area and the travel trailer body.
Figure 20:
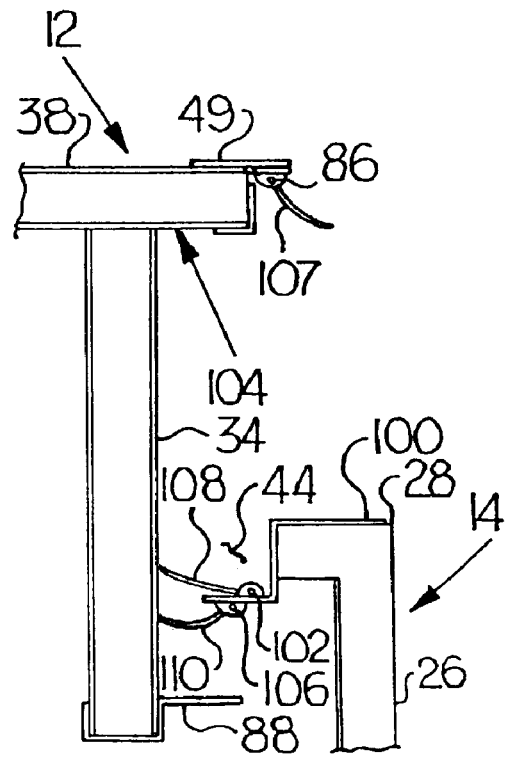
FIG. 20 is a schematic plan view of the right front corner of the slide-out area of FIG. 19 with the slide-out area in a substantially fully extended position.
Figure 21:
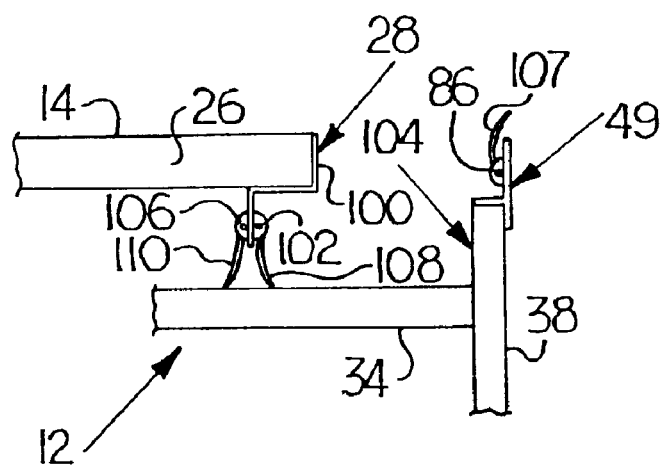
FIG. 21 is a schematic side view of a top portion of the slide-out area showing the sealing gaskets attached to the slide-out area and the travel trailer body.

Referring to FIGS. 19–21, a preferred sealing connection between the slide-out 12 and the trailer body 14 in accordance with the present invention is shown schematically. The trailer body 14 preferably includes a first flange plate 100 connected to the front end wall 28 of the trailer body 14. The first flange plate 100 preferably extends into the opening 44 in the front end wall 28 of the trailer body 14, and extends around the perimeter of the opening 44. A first sealing gasket 102 is affixed to the flange plate 100 to face an internal facing side 104 of the front end wall 38 of the slide-out 12 and, more particularly, the extended flange 49 around the front end wall 38 of the slide-out 12. A second sealing gasket 106 is affixed to the first flange plate 100 to face the opposite direction from the first sealing gasket 102. The first sealing gasket 102 preferably includes a wiper seal 108. The first sealing gasket 102 and wiper seal 108 preferably extend around the perimeter of the flange plate 100 and, hence, the opening 44.

The first sealing gasket 102 seals against the internal side 104 of the flange 49 of the front end wall 38 of the slide-out 12 in the retracted position of the slide-out 12. The sealing gasket 86 seals against the front end wall 28 of the trailer body 14 in the retracted position of the slide-out 12, as discussed previously. The latching devices 90 attached to the slide-out 12 are preferably used to compress the sealing gasket 86 and the first sealing gasket 102 to ensure a weather tight and substantially moisture proof seal between the slide-out 12 and the trailer body 14 in the retracted position of the slide-out 12. Thus, two sealing barriers are provided in the retracted and "locked" position of the slide-out 12 in accordance with the present invention.

The wiper seal 108 connected to the first sealing gasket is used to wipe the surfaces of the sidewalls 34, bottom wall 36, and roof 40 of the slide-out 12 as it is moved between the retracted and extended positions. The wiper seal 108 also provides a second barrier against the weather and water leakage into the trailer body 14 in both the extended and retracted positions of the slide-out 12. The wiper seal 108 may also be partially compressed by the latching devices 90 in the retracted and "locked" position of the slide-out 12. The sealing gasket 86 may also be provided with a wiper seal 107 as an added barrier against water intrusion into the trailer body 14.

As shown in FIG. 21, the second sealing gasket 106 substantially faces the lip portion 88 (i.e., a second flange plate) at the rear end of the slide-out 12. The second sealing gasket 106 includes a wiper seal 110 similar to the first sealing gasket 102 and wiper seal 108. The second sealing gasket 106 seals against the lip portion 88, or second flange plate, in the extended position of the slide-out 12. The wiper seal 110 serves the same purposes discussed previously in connection with the wiper seal 108 connected to the first sealing gasket 102. The second sealing gasket 106 is preferably compressed by the longitudinally directed forces generated by the clamping devices 72 discussed previously. As discussed previously, in the extended position of the slide-out 12, the clamping devices 72 are used to "lock" the slide-out 12 in its fully extended position. The clamping devices 72, in operation, generate longitudinally directed forces, which are further used to compress the second sealing gasket 106. The compression of the second sealing gasket 106 thus provides a weather tight and substantially water tight seal between the slide-out 12 and the trailer body 14 in the extended position of the slide-out 12. The wiper seal 110 further provides a second barrier against moisture intrusion into the trailer body 14 in both the retracted and extended position of the slide-out 12 in a similar manner to the wiper seal 108.

The above-described sealing connection between the slide-out 12 and trailer body 14 is further used to limit the outward and inward movement of the slide-out 12 relative to the trailer body 14. The lip portion 88, or second flange plate, prevents over extension of the slide-out 12, while the flange 49 prevents over retraction of the slide-out 12. Accordingly, the stop block (not shown) attached to the external support 56 may be dispensed with entirely with the foregoing sealing connection between the slide-out 12 and trailer body 14. The surfaces adjacent the first and second sealing gaskets 102, 106 and the sealing gasket 86 are preferably "troughed" or "channeled" to drain water away from the respective sealing gaskets and transport the water outside the trailer body 14.

The present invention provides an expandable travel trailer that significantly enhances the usable living space within the travel trailer. In addition, the travel trailer of the present invention has improved water leakage characteristics over the prior art by providing improved latching devices, which provide four points of strategic compression against one or more sealing gaskets. Further, the travel trailer of the present invention provides a slide-out area with a peaked roof that reduces or eliminates the collection of dirt and debris on the roof of the slide-out. Furthermore, the present invention provides a travel trailer having a slide-out area with an improved sliding mechanism for ease of use. Finally, the travel trailer of the present invention provides a three-point slidable connection between the slide-out and the trailer body, which enhances the stability of the slide-out and reduces vibration of the slide-out relative to the trailer body.

Unlike prior art arrangements, the slide-out area/bed of the present invention can be utilized when the bed is retracted inside the trailer, and not just when the trailer is fully extended. This permits the trailer to be used before it is fully set up, such as during transit and with the trailer still attached to the towing vehicle and with the bed already made up with sheets and blankets.

Although the present invention was described with reference to a preferred embodiment, obvious modifications and alterations of the invention may be made without departing from the spirit and scope of the invention. The scope of the present invention is intended to be defined by the appended claims and all equivalents thereof.

What is claimed is:

1. A travel trailer, comprising:
   a chassis having wheels;
   a trailer body attached to the chassis and comprising rigid sidewalls, a rigid front end wall, a rigid rear end wall, a rigid non-peaked roof, and a floor, the sidewalls, end walls, roof, and floor defining an internal space of the trailer body;
   a slide-out area extendable outward from the trailer body, the slide-out area extendable from a retracted position received substantially within the trailer body to an extended position extended outward from the trailer body, the slide-out area comprising:
      a rigid peaked roof;
      rigid sidewalls connected to the roof;
      a rigid bottom wall connected to the sidewalls; and
      a rigid front end wall connected to the roof, sidewalls, and bottom wall; and
   a removable external support for supporting the slide-out area in the extended position, the support comprising:
      a support member configured for removable connection to the trailer body; and
      a leg member connected to the support member, the leg member configured for removable connection to the chassis for supporting the slide-out area in the extended position,
   wherein the slide-out area is extendable from an end wall of the trailer body, the trailer body end wall defining an opening for receiving the slide-out area into the trailer body, and the front end wall of the slide-out area adapted to seal against the trailer body end wall in the retracted position, and
   wherein the leg member is pivotally connected to the support member.

2. The travel trailer of claim 1, further comprising an external roller attached to the front end wall of the slide-out area, the external roller positioned to coact with the support member such that when the slide-out area is moved between the extended and retracted positions the external roller is guided along the support member.

3. A travel trailer, comprising:
   a chassis having wheels;
   a trailer body attached to the chassis and comprising rigid sidewalls, a rigid front end wall, a rigid rear end wall, a rigid non-peaked roof, and a floor, the sidewalls, end walls, roof, and floor defining an internal space of the trailer body;
   a slide-out area extendable outward from the trailer body, the slide-out area extendable from a retracted position received substantially within the trailer body to an extended position extended outward from the trailer body, the slide-out area comprising:
      a rigid peaked roof;
      rigid sidewalls connected to the roof;
      a rigid bottom wall connected to the sidewalls; and
      a rigid front end wall connected to the roof, sidewalls, and bottom wall; and
   at least one clamping device attached to the slide-out area, the at least one clamping device comprising a first member attached to the slide-out area and a second member pivotally connected to the first member, the second member having a threaded tube, and the at least one clamping device further comprising a threaded member coacting with the threaded tube such that rotation of the threaded member in a first direction extends the threaded member to contact the trailer body and applies tension force between the slide-out area and the trailer body for reducing vibration therebetween,
   wherein the slide-out area is extendable from an end wall of the trailer body, the trailer body end wall defining an opening for receiving the slide-out area into the trailer body, and the front end wall of the slide-out area adapted to seal against the trailer body end wall in the retracted position.

4. A travel trailer, comprising:
   a chassis having wheels;
   a trailer body attached to the chassis and comprising rigid sidewalls, a rigid front end wall, a rigid rear end wall, a rigid roof, and a floor, the sidewalls, end walls, roof, and floor defining an internal space of the trailer body;
   a slide-out area extendable outward from one of the end walls of the trailer body, the slide-out area extendable from a retracted position received substantially within the trailer body to an extended position extended outward from the trailer body, the slide-out area comprising:
      a rigid roof;
      rigid sidewalls connected to the roof;
      a rigid bottom wall connected to the sidewalls; and
      a rigid end wall connected to the roof, sidewalls, and bottom wall, and
   at least one support leg pivotally attached to the bottom wall of the slide-out area and configured to removably connect to the chassis for supporting the slide-out area in the extended position, wherein the slide-out area is supported in the extended position by at least one external support comprising a support member extending from the trailer body end wall and a leg member connected to the support member.

5. A sealing arrangement for a travel trailer comprising a trailer body with a slide-out area, the trailer body defining an opening for receiving the slide-out area into the trailer body, and the slide-out area movable between a retracted position received substantially within the trailer body and an extended position extending outward from the trailer body, the sealing arrangement comprising:

a first flange plate connected to the trailer body and extending into the opening in the trailer body accommodating the slide-out area, the first flange plate having a pair of sealing gaskets attached to opposite sides thereof; and a second flange plate attached to an end of the slide-out area received within the trailer body, wherein when the slide-out area is in the extended position the second flange plate engages one of the sealing gaskets attached to the first flange plate to provide a substantially weather tight seal between the slide-out area and trailer body, and wherein when the slide-out area is in the retracted position a front end wall of the slide-out area engages the other of the pair of sealing gaskets to provide a substantially weather tight seal between the slide-out area and trailer body.

6. The sealing arrangement of claim 5, wherein the sealing gaskets comprise wiper seals for wiping rigid walls of the slide-out area as the slide-out area is moved between the extended and retracted positions.

7. The sealing arrangement of claim 5, further comprising an additional sealing gasket attached to the slide-out area for engaging the trailer body in the retracted position of the slide-out area.

8. A travel trailer, comprising:

a chassis having wheels;

a trailer body attached to the chassis and comprising rigid sidewalls, a rigid front end wall, a rigid rear end wall, a rigid roof, and a floor, the sidewalls, end walls, roof, and floor defining an internal space of the trailer body; and a slide-out area extendable outward from the trailer body, the slide-out area extendable from a retracted position received substantially within the trailer body to an extended position extended outward from the trailer body, the slide-out area comprising:

a rigid roof;

rigid sidewalls connected to the roof;

a rigid bottom wall connected to the sidewalls; and a rigid end wall connected to the roof, sidewalls, and bottom wall, wherein the slide-out area is supported in the extended position by at least one external support comprising a support member extending from the trailer body end wall and a lea member connected to the support member, and wherein the leg member is pivotally connected to the support member.

9. The travel trailer of claim 8, wherein the end wall of the slide-out area is adapted to seal against the trailer body end wall in the retracted position.

10. The travel trailer of claim 8, wherein the support member is configured for removable connection to the trailer body end wall.

11. The travel trailer of claim 8, wherein the leg member is configured for removable connection to the chassis for supporting the slide-out area in the extended position.

12. The travel trailer of claim 8, wherein the end wall of the slide-out area comprises a flange extending around the perimeter of the end wall of the slide-out area and a sealing gasket attached to the flange for sealing against the trailer body end wall in the retracted position of the slide-out area.

13. The travel trailer of claim 8, wherein a slidable connection between the slide-out area and the trailer body comprises:

a pair of substantially horizontal guide rails; and a pair of rollers received in the guide rails for providing slidable movement of the slide-out area relative to the trailer body.

14. A travel trailer, comprising:

a chassis having wheels;

a trailer body attached to the chassis and comprising rigid sidewalls, a rigid front end wall, a rigid rear end wall, a rigid roof, and a floor, the sidewalls, end walls, roof, and floor defining an internal space of the trailer body;

a slide-out area extendable outward from the trailer body, the slide-out area extendable from a retracted position received substantially within the trailer body to an extended position extended outward from the trailer body, the slide-out area comprising:

a rigid roof;

rigid sidewalls connected to the roof;

a rigid bottom wall connected to the sidewalls; and a rigid end wall connected to the roof, sidewalls, and bottom wall, and an external roller attached to the end wall of the slide-out area, the external roller positioned to coact with a support member such that when the slide-out area is moved between the extended and retracted positions the external roller rolls along the support member, wherein the slide-out area is supported in the extended position by at least one external support comprising the support member extending from the trailer body end wall and a leg member connected to the support member.

15. The travel trailer of claim 14, wherein the end wall of the slide-out area is adapted to seal against the trailer body end wall in the retracted position.

16. The travel trailer of claim 14, wherein the support member is configured for removable connection to the trailer body end wall.

17. The travel trailer of claim 14, wherein the leg member is configured for removable connection to the chassis for supporting the slide-out area in the extended position.

18. The travel trailer of claim 14, wherein the end wall of the slide-out area comprises a flange extending around the perimeter of the end wall of the slide-out area and a sealing gasket attached to the flange for sealing against the trailer body end wall in the retracted position of the slide-out area.

19. The travel trailer of claim 14, wherein a slidable connection between the slide-out area and the trailer body comprises:

a pair of substantially horizontal guide rails; and a pair of rollers received in the guide rails for providing slidable movement of the slide-out area relative to the trailer body.

20. A travel trailer, comprising:

a chassis having wheels;

a trailer body attached to the chassis and comprising rigid sidewalls, a rigid front end wall, a rigid rear end wall, a rigid roof, and a floor, the sidewalls, end walls, roof, and floor defining an internal space of the trailer body;

a slide-out area extendable outward from the trailer body, the slide-out area extendable from a retracted position received substantially within the trailer body to an extended position extended outward from the trailer body, the slide-out area comprising:
a rigid roof;
rigid sidewalls connected to the roof;
a rigid bottom wall connected to the sidewalls; and
a rigid end wall connected to the roof, sidewalls, and bottom wall, and a latching device associated with the trailer body end wall and the end wall of the slide-out area for securing the slide-out area in the retracted position, wherein the slide-out area is supported in the extended position by at least one external support comprising a support member extending from the trailer body end wall and a leg member connected to the support member.

21. The travel trailer of claim 20, wherein the end wall of the slide-out area is adapted to seal against the trailer body end wall in the retracted position.

22. The travel trailer of claim 20, wherein the support member is configured for removable connection to the trailer body end wall.

23. The travel trailer of claim 20, wherein the leg member is configured for removable connection to the chassis for supporting the slide-out area in the extended position.

24. The travel trailer of claim 20, wherein the end wall of the slide-out area comprises a flange extending around the perimeter of the end wall of the slide-out area and a sealing gasket attached to the flange for sealing against the trailer body end wall in the retracted position of the slide-out area.

25. The travel trailer of claim 20, wherein a slidable connection between the slide-out area and the trailer body comprises:
a pair of substantially horizontal guide rails; and
a pair of rollers received in the guide rails for providing slidable movement of the slide-out area relative to the trailer body.

26. The travel trailer of claim 20, wherein the latching device comprises a rod operatively associated with at least one cam action engagement, such that rotational movement of the rod causes the at least one cam action engagement to exert compressive pressure on the slide-out area relative to the trailer body end wall.

27. The travel trailer of claim 26, further comprising a lever arm associated with the rod for imparting the rotational movement to the rod.

28. The travel trailer of claim 26, wherein the rod is disposed on the end wall of the slide-out area and the at least one cam action engagement is disposed on the trailer body end wall.

29. A travel trailer, comprising:

a chassis having wheels;

a trailer body attached to the chassis and comprising rigid sidewalls, a rigid front end wall, a rigid rear end wall, a rigid roof, and a floor, the sidewalls, end walls, roof, and floor defining an internal space of the trailer body;

a slide-out area extendable outward from one of the end walls of the trailer body, the slide-out area extendable from a retracted position received substantially within the trailer body to an extended position extended outward from the trailer body, the slide-out area comprising:
a rigid roof;
rigid sidewalls connected to the roof;
a rigid bottom wall connected to the sidewalls; and
a rigid end wall connected to the roof, sidewalls, and bottom wall; and a latching device associated with the trailer body end wall and the end wall of the slide-out area for securing the slide-out area in the retracted position, wherein the latching device comprises a rod operatively associated with at least one cam action engagement, such that rotational movement of the rod causes the at least one cam action engagement to exert compressive pressure on the slide-out area relative to the trailer body end wall.

30. The travel trailer of claim 29, further comprising a lever arm associated with the rod for imparting the rotational movement to the rod.

31. The travel trailer of claim 33, wherein the rod is disposed on the end wall of the slide-out area and the at least one cam action engagement is disposed on the trailer body end wall.

* * * * *

UNITED STATES PATENT AND TRADEMARK OFFICE
CERTIFICATE OF CORRECTION

PATENT NO. : 6,854,787 B2
DATED : February 15, 2005
INVENTOR(S) : Gehman et al.

It is certified that error appears in the above-identified patent and that said Letters Patent is hereby corrected as shown below:

Column 13,
Line 58, "lea member" should read -- leg member --.

Column 16,
Line 41, "trailer of claim 33" should read -- trailer of claim 29 --.

Signed and Sealed this

Sixth Day of September, 2005

JON W. DUDAS
*Director of the United States Patent and Trademark Office*